Figure 1:
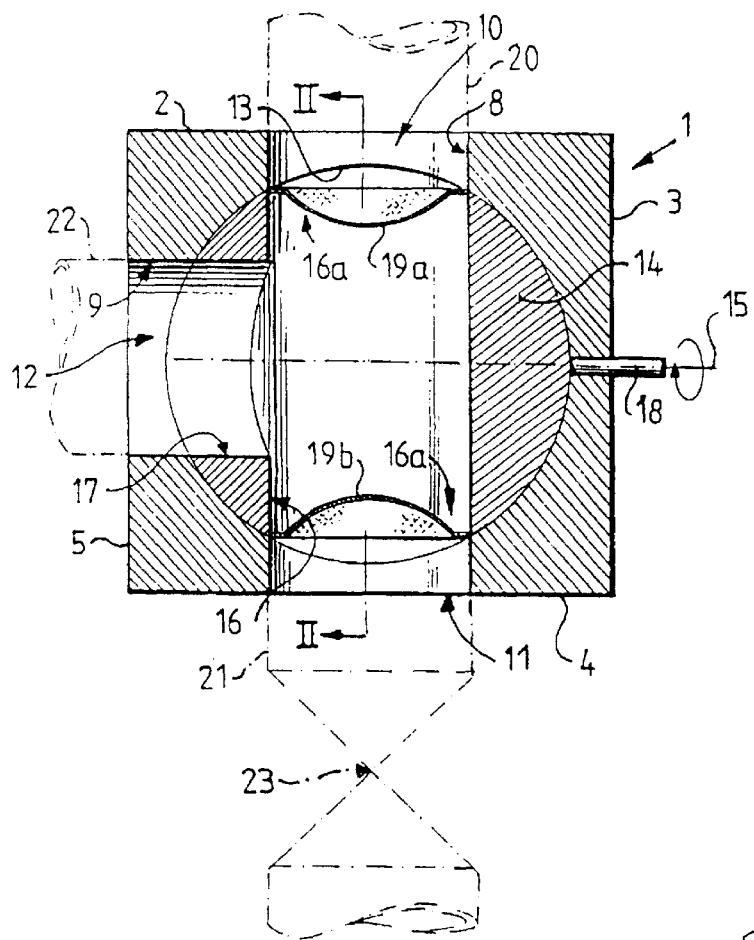

United States Patent
Solbakke et al.

[11] Patent Number: 5,853,584
[45] Date of Patent: Dec. 29, 1998

[54] SELF-CLEANING FILTER FOR FILTERING OF LIQUIDS AND GASES

[75] Inventors: Hans Terje Solbakke, Lunde, Norway; Björn Säfwenberg, Saltsjö-Duvnäs, Sweden

[73] Assignee: Bandak AS, Lunde, Norway

[21] Appl. No.: 765,906

[22] PCT Filed: May 8, 1996

[86] PCT No.: PCT/SE96/00605

§ 371 Date: Jan. 8, 1997

§ 102(e) Date: Jan. 8, 1997

[87] PCT Pub. No.: WO97/46301

PCT Pub. Date: Dec. 11, 1997

[30] Foreign Application Priority Data

May 8, 1995 [SE] Sweden ................................ 9501705

[51] Int. Cl.⁶ .......................... B01D 35/04; B01D 35/22
[52] U.S. Cl. .......................... 210/390; 210/423; 210/426; 210/427; 210/432; 55/422; 137/549; 137/625.47
[58] Field of Search .................................. 210/357, 427, 210/359, 390, 418, 420, 422, 423, 424, 425, 428, 432, 426; 137/549, 625.47; 425/197, 199; 55/288, 422, 431

[56] References Cited

U.S. PATENT DOCUMENTS

| | | | |
|---|---|---|---|
| 241,352 | 5/1881 | Grant | 210/390 |
| 270,255 | 1/1883 | Smart . | |
| 1,646,514 | 10/1927 | Winton . | |
| 2,129,985 | 9/1938 | Bartsch . | |
| 3,645,401 | 2/1972 | Roberts | 210/426 |
| 4,056,474 | 11/1977 | Snouffer | 210/390 |
| 4,806,258 | 2/1989 | Duncan | 210/423 |
| 5,199,458 | 4/1993 | Wen | 137/549 |

FOREIGN PATENT DOCUMENTS

| | | |
|---|---|---|
| 117288 | 4/1970 | Denmark . |
| 0207233 | 1/1987 | European Pat. Off. . |
| 0476546 | 3/1992 | European Pat. Off. . |

*Primary Examiner*—W. L. Walker
*Attorney, Agent, or Firm*—Birch, Stewart, Kolasch, & Birch, LLP

[57] ABSTRACT

A filter for filtering of a fluid, including a housing having an inlet port for the fluid to be filtered, an outlet port for filtered fluid and an outlet port for filtered fluid and an outlet port for rehect, In a body arranged in the housing to be rotatable between at least two positions of rotation, there are at least two positions of rotation, there are at least two interconnecting flow channels of which at least a first is provided with a filtering means through which filtering takes place in a first rotational position, wherein one end of the first flow channels communicates with the inlet port, and through which backwash takes place in the second rotational position, wherein said end of the first flow channel communicates with the outlet port for reject. The first flow channel is provided with a filtering means at each end. A second of the at least two flow channels connects to the first flow channel between the filtering means and is in constant connection with the outlet port for filtered fluid. The outlet port for reject is provided with a shutting means openable for backwashing.

7 Claims, 3 Drawing Sheets

SELF-CLEANING FILTER FOR FILTERING OF LIQUIDS AND GASES

The present invention concerns a self-cleaning filter for filtering of liquids and gases, particularly for filtering liquids within the paper and pulp industry, according to the preamble of claim 1.

Within all process industry it is more and more common to arrange processes to the fullest possible extent closed in order to reduce the loss of material and not the least to prevent environmental pollution.

For instance, when dewatering pulp, the pulp contains fibres of different sizes, and for that reason some solid particles will be brought along by the water to a greater or smaller extent.

The fact that particles (fibres) tend to be brought along by the water creates problems for subsequent equipment. Filtrate water is commonly sent back to the machine it came from or sent further forward in the process to be used for instance for nozzles for flushing, filter cake removal and washing. Such nozzles have relatively small apertures (0,5–0,7 mm) to reduce the water consumption. Thus, there is a need to remove solid particles by filtration.

Today, there are numerous systems for separating solid particles from a liquid. Normally, these are atmospheric or pressurized tanks including filter elements of different kinds. Continuously working filters are big and clumsy, and their filter elements tend to yield under high pressures. Non-continuous filters involve interruptions in the process for backwashing or other cleaning of the filter elements.

From the Danish laid-open patent application 117.288 is previously known a self-cleaning filter according to the preamble of claim 1. In this filter, however, the channels are directed in a complicated manner within the housing as well as in the rotating body, particularly as concerns channels for discharge of reject at backwashing. Further, the channels extending through the rotatable body are conically tapering in the flow direction, which, apart from complicated manufacture, results in an increased pressure drop as well as clogging by particles brought along by the fluid being filtered.

The present invention has as its object to provide a filter of the kind stated which is not suffering from the drawbacks mentioned and which is moderate in size, has resistant filter elements and works substantially continuously, that is, that cleaning of clogged filter elements shall be enabled without considerable interruptions in the filtering process. Further, the filter shall be simple to maintain.

These objects are achieved by a filter according to the present invention which has been given the characteristic features stated in the appended claims.

Figure 2:
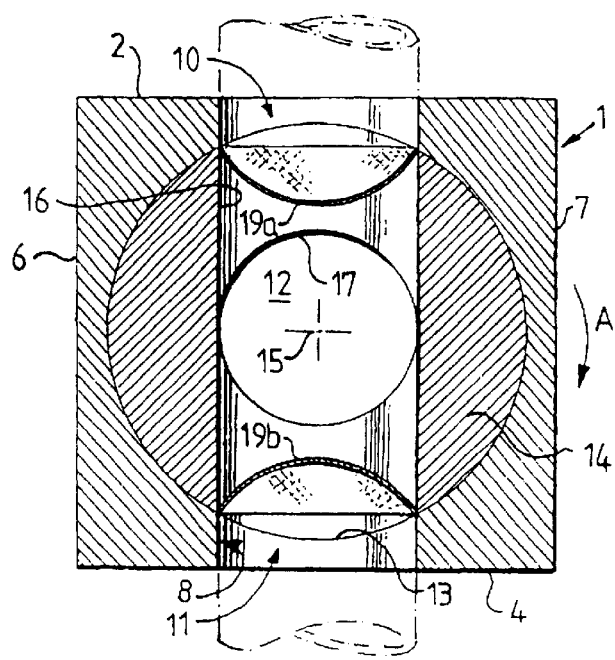
Figure 3:
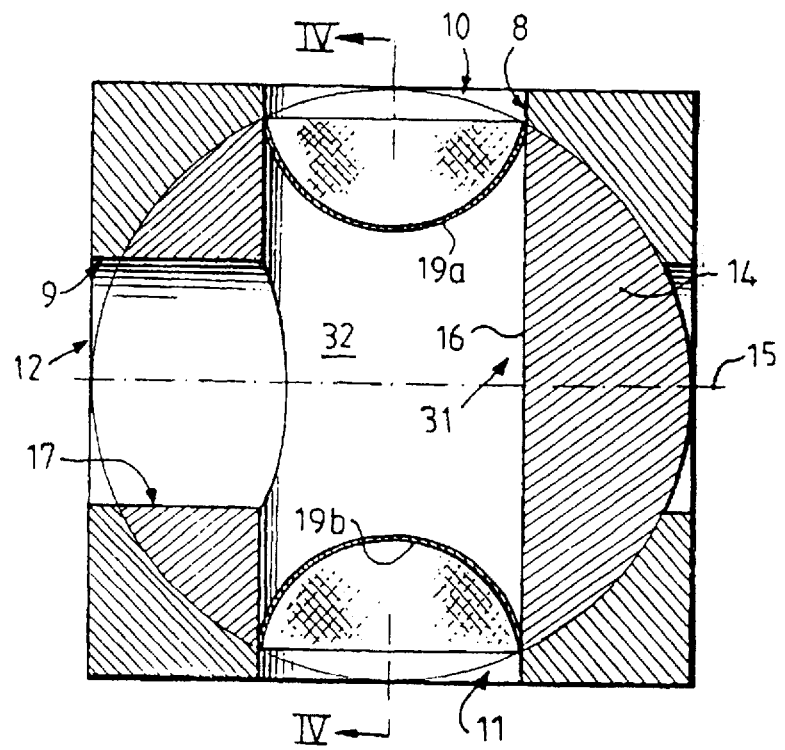
Figure 4:
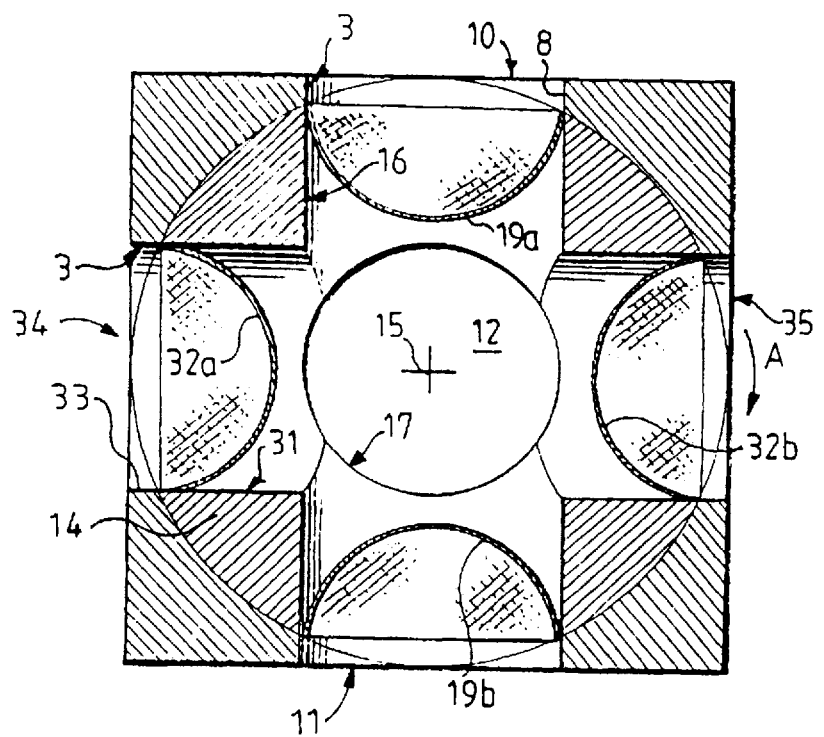
Figure 5:
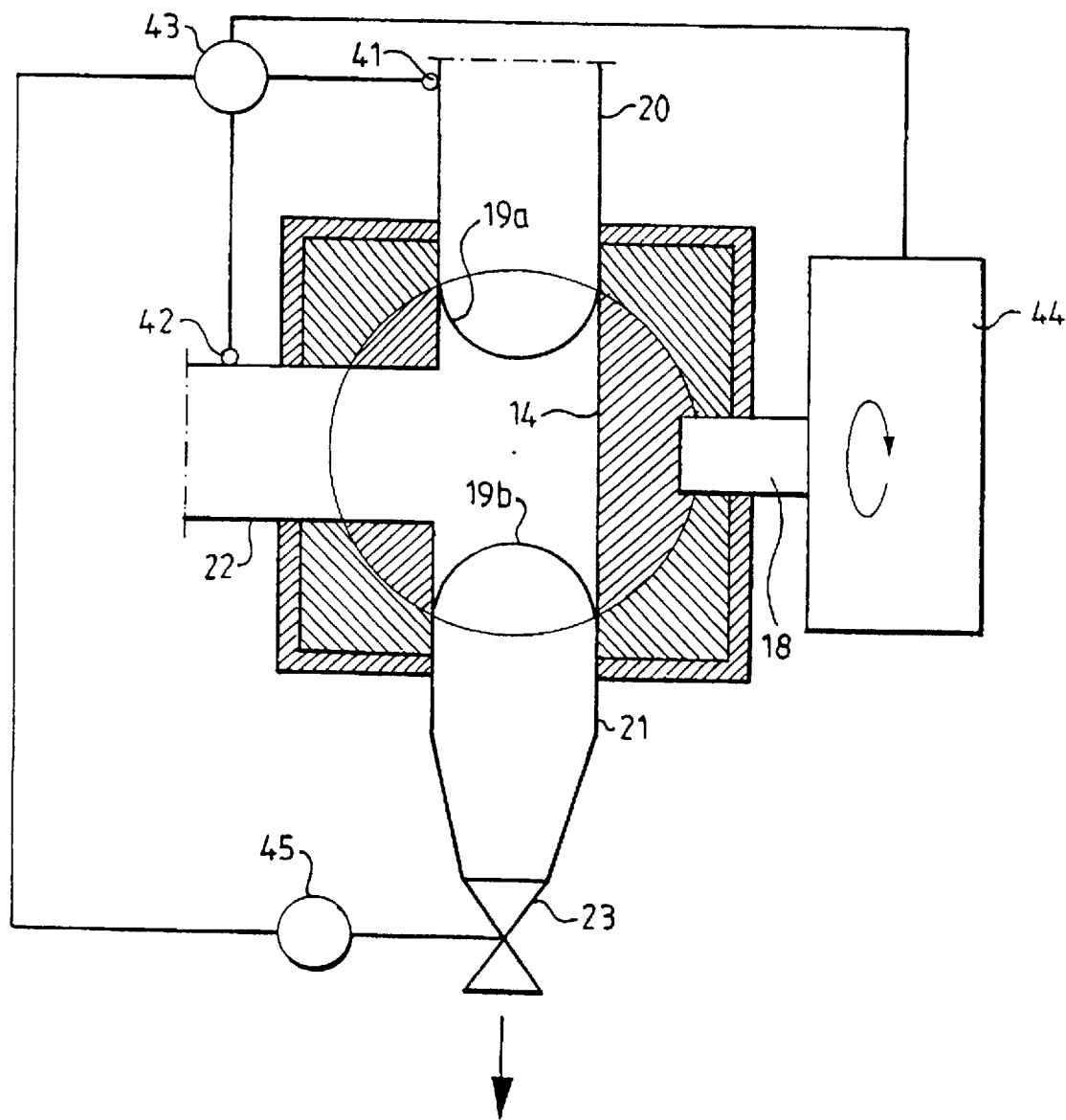

The invention will be described hereinafter, reference being made to the attached schematic drawings, wherein:

FIG. 1 is a vertical section through a filter housing having a rotatable body according to a first embodiment of the invention, FIG. 2 is a section taken along line II—II of FIG. 1, FIG. 3 is a section corresponding to the section according to FIG. 1 through a filter housing having a rotatable body according to a second embodiment of the invention, FIG. 4 is a section taken along line IV—IV of FIG. 3, and FIG. 5 is a scheme showing a control of a filter according to the invention.

The embodiment of the invention shown in FIGS. 1 and 2 includes a substantially cubical housing 1 defined by walls 2, 3, 4, 5, 6, and 7. A through bore 8 extends between the walls 2 and 4. A cross bore 9 opening in the wall 5 connects to the bore 8. The mouth of the bore 8 in the wall 2 constitutes an inlet port 10 and its mouth in the wall 4 constitutes a first outlet port 11. The mouth of the bore 9 in the wall 5 constitutes a second outlet port 12.

In a spherical recess 13 in the housing 1 is accomodated a likewise spherical body 14 rotatable about an axis 15. A first bore or fluid channel 16 having a first end 16a and a second end 16b extends diametrically through the body 14. The bore 16 is perpendicular to the axis 15 and has substantially the same diameter as the bore 8. A second bore or fluid channel 17 being substantially concentrical to the axis 15 and having substantially the same diameter as the bore 9 extends from the envelope surface of the body 14 and opens in the bore 16 between its ends 16a and 16b. The body 14 is provided with a stub shaft 18 which extends through the wall 3 of the housing and by means of which the body 14 is rotatable about the axis 15.

In each end 16a, 16b of the bore 16 is located a filtering means or sieve 19a, 19b, respectively. Suitably, each such sieve has the shape of a basket. Since the bore 16 has a cylindrical cross section, the sieve baskets obtain a shape that is advantageous from a strength point of view, such as the shape of a segment of a sphere.

By rotating the body 14 by means of the shaft 18, the end 16a of the bore 16 may be selectively connected to the inlet port 10 or the first outlet port 11, at the same time as the opposite end 16b of the bore is connected to the first outlet port 11 or the inlet port 10, respectively. Simultaneously, the bore 17 is in constant communication with the second outlet port 12.

An inlet conduit 20 is connected to the inlet port 10, a first outlet conduit 21 to the first outlet port 11 and a second outlet conduit 22 to the second outlet port 12. In the first outlet conduit 21 there is a shut-off valve 23.

The function of the filter according to the invention is the following. The body 14 being in the position shown in FIG. 1, where the first end 16a of the fluid channel 16 communicates with the inlet 10 and its second end with the first outlet port 11, a liquid to be filtered, for instance process water in a paper mill, is introduced from the conduit 20 into the inlet port 10. At this stage the valve 23 is closed. Therefore, the fluid is led through the sieve 19a into the first channel 16, and therefrom through the second channel 17 out through the connecting second or filtrate outlet port 12 to the outlet conduit 22 (filtrate outlet). After some time of operation the sieve 19a becomes so clogged by solid articles, such as fibres, that the flow decreases. At this stage, the body 14 is rotated through 180° in the direction of arrow A, such that the first end 16 of the channel 16 is brought into communication with the first outlet port 11, while the second end 16b now will communicate with the inlet port 10. Consequently, the hitherto unused sieve 19b ends up at the inlet port and is able to immediately commence its filtering function since the second channel 17 is in constant communication with the outlet conduit 22. The clogged sieve 19a will now be located at the first outlet port 11. At the same time or somewhat later the valve 23 is opened so that a part of the flow from the inlet port 10 is directed straight through the channel 16 from its second end 16b, through the sieve 19b and to the first end 16a of the channel, where the flow also meets the sieve 19a in a direction opposite to the filtering direction. Hereby, backwashing of the sieve with filtrate take place and solid material flushed off is directed out through the outlet conduit 21. After a relatively short time, the valve 23 is closed, whereupon the entire flow is directed towards the filtrate outlet 22.

When the sieve 19b has been clogged the sequence described is repeated.

The embodiment shown in FIGS. 3 and 4 differs from the previous one primarily in that the rotatable body, apart from the first bore 16 having sieves 19a and 19b in its ends, has a further bore 31 perpendicularly crossing the bore 16 and having sieves 32a and 32b in its ends. As before, the housing 1 has an inlet port 10, a first outlet port 11 and a second outlet port 12. It is realized that in operation of the filter according to this embodiment, the body 14 may, when the sieve 19a is clogged, be rotated through 90° in the direction of arrow A to the position occupied by the sieve 32b in FIG. 4, the sieve 32a then being active at the inlet port 10. When also the sieve 32a has been clogged, the body 14 is further rotated through 90°. The sieve 19b then becomes operative at the inlet port, while the sieve 19a first clogged occupies the position at the outlet port 11 and may be backwashed in the manner previously described. This embodiment enables en even higher degree of continuous filtration than the former embodiment.

In FIG. 4 is shown also that, apart from the bores 8 and 9 having ports 10, 11 and 12, the housing may have a further bore 33 having ports 34 and 35. These ports are normally closed by non-shown covers that may be removed for maintenance and exchange of sieves without the necessity to remove the inlet and outlet conduits 20, 21, respectively, from the ports 10, 11, respectively.

FIG. 5 schematically shows an arrangement for control of a 25 filter according to the invention. 41 designates a pressure sensor, sensing the pressure in the inlet conduit 20, and 42 a pressure sensor sensing the pressure in the outlet conduit 22. 43 designates a control unit (computer), 44 a drive unit for the shaft 18, and 45 a control device for the valve 23. In operation of the filter, the pressure is continuously detected in the inlet conduit 20 and the outlet conduit 22. When the pressure differential has reached a certain pre-determined value, a control unit 43 transmits the signal to the drive unit 44 that rotates the body 14 through 180° (when a filter according to FIGS. 1 and 2 is concerned) or through 90° (when a filter according to FIGS. 3 and 4 is concerned). At the same time, or somewhat later, a control unit 43 transmits a signal to the control device 45 that opens the valve 23 during a short time for backwash of a sieve located at the outlet port.

It is realized that some other symmetrical body of rotation than a sphere can be used as rotatable body 14, for instance a straight circular cylinder.

The foregoing description and drawings refer to embodiments having one or two through flow channels and stepwise rotation of the rotatable body. However, embodiments having more than two such channels are conceivable, it being realized that a larger number of channels results in an increasing continuity in the filtering process due to an decreasing arc distance between adjacent ports and consequently shorter switching distance and times. At a larger number of channels, these can be arranged to more or less overlappingly communicate with the inlet port and the first outlet port, respectively, the rotatable body then being driven in slow continuous rotation. In such an embodiment the control unit 43 and the pressure sensors 41, 42 could be dispensed with and only a simpler governing of the control device 45 could be employed, so that the valve 23 opens during a short time just when a sieve passes the second outlet port 11.

We claim:

1. Filter for filtering of a fluid, including a housing (1) having an inlet port (10) for the fluid to be filtered, an outlet port (12) for filtered fluid and an outlet port (11) for reject as well as a body (14) arranged in the housing to be rotatable between at least two positions of rotation and having at least two intercommunicating flow channels of which at least a first (16a, 16b) is provided with a filtering means (19a) through which filtering takes place in a first rotational position, wherein one end (16a) of the first flow channel communicates with the inlet port (10), and through which backwash takes place in the second rotational position, wherein said end (16a) of the first flow channel communicates with the outlet port (11) for reject, characterized in that the first flow channel (16a, 16b) is provided with a filtering means (19a, 19b) at each end, that a second (17) of the at least two flow channels connects to the first (17) flow channel between the filtering means (19a, 19b) and is in constant connection with the outlet port (12) for filtered fluid, and that the outlet port (11) for reject is provided with a shutting means (23) openable for backwashing.

2. Filter according to claim 1, characterized in that the first flow channel (16) extends diametrically through the body (14) and that the second flow channel extends perpendicularly to a plane, in which the first flow channel rotates at rotation of the rotatable body between the two rotational positions.

3. Filter according to claim 2, characterized in that a further flow channel (32) located in said plane diametrically extends through the body (14) perpendicularly to the first flow channel (16), and that a filtering means (32a, 32b) is arranged at each of the two ends of the further flow channels.

4. Filter according to claim 1, characterized by a plurality of flow channels located in said plane and diametrically extending through the rotatable body, and means for continuously rotating the rotatable body and to open a valve (23) arranged at the outlet port (11) for reject when the filtering means (19b) is located at this outlet port.

5. Filter according to claims 3 or 4, characterized in that, apart from the inlet port (10) and the outlet port (11) for reject, the housing is provided with normally shut ports (34, 35) through which the filtering means (19a, 19b; 32a, 32b) are accessible.

6. Filter according to claim 1, characterized in that all flow channels are cylindrical.

7. Filter according to claim 1, characterized in that the filtering means (19; 32) have the shape of segments of a sphere.

* * * * *